United States Patent [19]

Senjo et al.

[11] 3,957,949
[45] May 18, 1976

[54] PROCESS FOR REMOVING NITROGEN OXIDES FROM GAS

[75] Inventors: Teizo Senjo, Machida; Makio Kobayashi, Toyonaka, both of Japan

[73] Assignees: Fuji Kasui Engineering Co., Ltd., Tokyo; Sumitomo Metal Industries, Ltd., Osaka, both of Japan

[22] Filed: Apr. 2, 1974

[21] Appl. No.: 457,208

[30] Foreign Application Priority Data
Apr. 10, 1973  Japan.............................. 48-40052

[52] U.S. Cl................................ 423/235; 423/393; 423/400; 423/482
[51] Int. Cl.².......................................... B01D 53/34
[58] Field of Search ........... 423/235, 239, 477, 393, 423/394, 400, 499, 482

[56] References Cited
UNITED STATES PATENTS

| | | | |
|---|---|---|---|
| 3,023,076 | 2/1962 | Karwat................................ | 423/235 |
| 3,149,907 | 9/1964 | Karwat................................ | 423/235 |
| 3,773,897 | 11/1973 | Fields et al. ......................... | 423/235 |

*Primary Examiner*—Earl C. Thomas
*Attorney, Agent, or Firm*—Armstrong, Nikaido & Wegner

[57] ABSTRACT

A process for efficiently removing nitrogen oxides with a very high rate from waste gas is provided wherein nitrogen monoxide contained in the gas is oxidized by chlorine dioxide or ozone, and then the oxidized gas is brought into contact with sodium chlorite in water solution in an absorption column.

9 Claims, No Drawings

PROCESS FOR REMOVING NITROGEN OXIDES FROM GAS

This invention relates to a wet process for removing nitrogen oxides (NOx) from waste gas containing NOx, such as, for example flue gas, tail gas from nitric acid plants, waste gas from metal dissolving and pickling plants and other gases containing nitrogen oxides, and more particularly, to a wet process for removing nitrogen oxides, especially nitrogen monoxide (NO) and nitrogen dioxide ($NO_2$) from waste gas by oxidizing nitrogen monoxide contained in the waste gas to nitrogen dioxide and then bringing the waste gas into contact with an aqueous sodium chlorite solution in an absorption column.

Recently, due to rapidly increasing industrial production, nitrogen oxides, especially nitrogen monoxide and nitrogen dioxide in said waste gas have caused serious problems of atmospheric contamination or air pollution. In order to prevent such air pollution based on waste nitrogen oxides, various waste gas denitration processes and apparatus have been eagerly developed and some of them have been tested in industrial scale, and especially, in some pickling plants commercial denitration plants are all ready being used.

The processes known for the removal of nitrogen oxides from waste gas are of three main types; the first type employs solid adsorbents such as activated carbon or silica gel, which adsorbs nitrogen oxides from waste gas, this is the so-called adsorption process, the second type employs liquid absorbents which absorbs nitrogen oxides from waste gas, this is the so-called absorption process, and the third type employs a reducing agent which reduced nitrogen oxides in waste gas to nitrogen, this is the so-called catalytic reduction process.

Of these three conventional processes, the adsorption process is not suitable for treating large amounts of waste gas because a large-sized apparatus is required, and the catalytic reduction process is not suitable for treating waste gases which contain relatively a high concentration of oxygen because the reducing agent to reduce nitrogen monoxide is wastefully consumed by the oxygen and also because the reduction reaction is not fully effected.

Heretofore, the absorption processes have been well-known as processes which comprise contacting waste gas containing nitrogen oxides with a liquid absorbent in an absorption column, such as, for example a spray column, a packed column, various scrubbers or the like. The liquid absorbent includes water, an aqueous ammonium solution, an aqueous sodium hydroxide solution, an aqueous solution of $NaClO_x$ ($x$ = 1, 2 or 3), an aqueous sodium thiosulfate solution ($Na_2S_2O_3$), an aqueous ferrous sulfate solution ($FeSO_4$) or the like. However, in these conventional absorption processes, the rate of removal of nitrogen oxides is generally unsatisfactory especially since there is no process whereby waste gas containing a relatively low concentration of nitrogen oxides can be effectively treated.

Accordingly, the main objects of the present invention are to obviate these problems of the aforementioned conventional absorption denitration processes, to provide a novel absorption denitration process which is capable of removing nitrogen oxides from waste gas with an enhanced efficiency and is also capable of treating the gas economically with a compact apparatus.

Other objects and advantages of the present invention will be apparent from the following description.

In accordance with the present invention, there is provided a process for removing nitrogen oxides from waste gas containing nitrogen oxides comprising the steps of adding chlorine dioxide or ozone to the waste gas whereby nitrogen monoxide contained in the waste gas undergoes an oxidation reaction, and then contacting the waste gas with an aqueous sodium chlorite solution in an absorption column.

When waste gas containing sulfur oxides together with nitrogen oxides is treated, the sulfur oxides in the waste gas are previously removed from the gas by any conventional desulfurization process prior to removal of nitrogen oxides from the gas. Such desulfurization processes include a wet desulfurization process such as, for example, the water scrubbing process, the alkali scrubbing process, the ammonium scrubbing process, the lime scrubbing process, the sulfuric acid scrubbing process, or the magnesia scrubbing process, and also include a dry desulfurization process such as, for example the adsorption process employing activated carbon or activated manganese oxide. The reason why sulfur oxides are removed from waste gas prior to the denitration is that, due to the presence of sulfur dioxide ($SO_2$) in the gas, sodium chlorite ($NaClO_2$) used in the present denitration reaction is reduced by the sulfur oxide in the gas, and hence the amount of sodium chlorite used in denitration reaction suddenly and uneconomically increases.

It is known that sodium chlorite can be used in a process for removing nitrogen oxide from gas. However, heretofore, the reaction or scrubbing mechanisms of nitrogen oxides with sodium chlorite were by no means clear, and there have been several instances where the mechanisms have been reported in papers by mistake. For example, heretofore the dominant factor in the removal of NOx by the oxidation reaction of nitrogen oxides or the absorption of nitrogen oxides, has not been clear, and therefore waste gas containing nitrogen oxides have only been scrubbed with an aqueous sodium chlorite solution according to prior practice. This is attributable to the fact that a method of quantitative analysis for separately determining the contents of nitrogen monoxide and nitrogen dioxide in a gas had not completely been established.

But now, a method of quantitative analysis for separately determining the contents of nitrogen monoxide and nitrogen dioxide in a gas in the presence of available chlorine-containing compounds has been established, whereby reaction mechanisms of nitrogen oxides with chlorine dioxide and sodium chlorite, both used in the present invention, are clarified. That is, the reagent which oxidizes nitrogen monoxide is not sodium chlorite but chlorine dioxide, and further the rate of absorption of nitrogen monoxide with sodium bichlorite in water solution is extremely low. Oxidation reaction of nitrogen monoxide with chlorine dioxide may be expressed by the following equation (1):

$$2NO + ClO_2 + H_2O = NO_2 + HNO_3 + HCl \qquad (1)$$

For instance, in a case where desulfurized flue gas containing nitrogen oxides is continuously treated with 5% by weight of an aqueous sodium chlorite solution in a Moredana plate column (a perforated plate or grid plate column without weir and downcomer) including two perforated plates with a free-space ratio of 0.31, where the gas was brought into countercurrent contact with the sodium chlorite solution under conditions of liquid temperature of approximately 52°C and pH of 7.4, the rate of oxidation of nitrogen monoxide into nitrogen dioxide was relatively high at the beginning of the test, but became lower as time passed. This is because at the beginning of the test, chlorine dioxide which coexisted with sodium chlorite as an impurity oxidized nitrogen monoxide and therefore the rate of the oxidation was relatively high, but as the amount of chlorine dioxide which coexisted with sodium chlorite decreases with the passing of time, the rate of the oxidation became lower. Under these conditions, in case fresh chlorine dioxide is introduced into the sodium chlorite solution, the rate of the oxidation again becomes higher.

It is also known that nitrogen monoxide can be oxidized by ozone. However it has now been certified that the main reaction of nitrogen monoxide with ozone depends on mole ratio of ozone ($O_3$) to nitrogen monoxide (NO), i.e. $O_3/NO$, and that in a case having the ratio ($O_3/NO$) of 0.5 – 1.0 the preferable reaction for denitration occurs. The main oxidation reaction of nitrogen monoxide with ozone in a case having the ratio ($O_3/NO$) of 0.5 and 1.0 is expressed by the following equations (2) and (3), respectively.

$$2NO + O_3 = N_2O_3 + O_2 \tag{2}$$

$$NO + O_3 = NO_2 + O_2 \tag{3}$$

It has been generally said that nitrogen dioxide in gas is easy to be absorbed or scrubbed from the gas with an alkaline solution such as an aqueous caustic soda solution or a reducing solution such as an aqueous sodium thiosulfate solution. However, a sufficient rate of absorption of nitrogen oxides cannot be obtained by these liquid absorbents. On the contrary, the present liquid absorbent, i.e. sodium chlorite in water solution can absorb or scrub nitrogen dioxide contained in a gas with a high rate of absorption. The absorption reaction is represented by the following equation (4):

$$4NO_2 + NaClO_2 + 2H_2O = 4HNO_3 + NaCl \tag{4}$$

As an example, the experimental results of denitration tests are shown in the following Table 1. These results were obtained by treating flue gas containing nitrogen oxides with each of the liquid absorbents listed in Table 1 in the following manner. That is, after sulfur oxides contained in the flue gas were removed from the gas by using a lime desulfurization process, chlorine dioxide was added into the gas containing approximately 200 ppm of nitrogen monoxide to oxidize the nitrogen monoxide into nitrogen dioxide, and then the gas containing approximately 100 ppm of nitrogen dioxide was brought into countercurrent contact with each of the liquid absorbents listed in Table 1 in a packed column packed with Tellerette packing (height of packed bed was 2 m) under conditions of superficial gas velocity of 0.1 m/sec and liquid-gas ratio (L/G) of 10.

Table 1

| Liquid absorbent | Content of nitrogen dioxide in off-gas from the column (ppm) |
| --- | --- |
| 2% by weight of $NaClO_2$ in water solution | 15 |
| 2% by weight of NaOH | 45 |

Table 1-continued

| Liquid absorbent | Content of nitrogen dioxide in off-gas from the column (ppm) |
| --- | --- |
| in water solution 2% by weight of $Na_2S_2O_3$ in water solution | 34 |
| Water | 40 |

In one aspect of the present denitration process, chlorine dioxide or ozone employed for oxidizing nitrogen monoxide in gas is added to gas containing nitrogen oxide at the feeding pipe or duct through which the gas to be treated is fed into an absorption column. The part of the gas feeding pipe or duct to which chlorine dioxide or ozone is added has to be designed with such a dimension that the gas flow in the pipe or duct is in a turbulent flow condition. In a case where chlorine dioxide or ozone is fed into the gas at the gas feeding duct into the oxidation column, the gas to be treated has a temperature preferably below 70°C and is preferably saturated with water vapor. The chlorine dioxide or ozone so added instantaneously reacts with nitrogen monoxide contained in the gas under such conditions. In a case where gas containing sulfur oxides and nitrogen oxides is, in turn, treated in the desulfurization apparatus and in the denitration apparatus, chlorine dioxide or ozone can be added to the gas either at the gas feeding duct of the desulfurization apparatus or at the gas feeding duct of the denitration apparatus.

In another aspect of the present invention, chlorine dioxide or ozone to be employed for oxidizing nitrogen monoxide in waste gas is introduced into an oxidation column where chlorine dioxide or ozone is mixed with the gas to be treated which is also fed into the oxidation column. A gaseous mixture of the gas containing nitrogen oxides and chlorine dioxide or ozone is brought into for example countercurrent, contact with an aqueous sodium chlorite solution, caustic soda solution, water or the like which is circulated through the column, and the nitrogen monoxide in the gas undergoes oxidation reaction. The aqueous solution or water serves as the medium in which chlorine dioxide or ozone introduced into the column is dissolved and the oxidation reaction of nitrogen monoxide effectively occurs. In the oxidation column, a part of the nitrogen dioxide contained in the gas to be treated is removed from the gas and absorbed into the aqueous solution or water. Both the temperatures of the gas to be treated and the liquid to be circulated in the oxidation column is preferably, but by no means limited to, below 70°C, and the pH of the liquid is preferably within the range of 5 to 10. In a modified embodiment of this aspect, chlorine dioxide or ozone dissolved in the sodium chlorite, caustic soda or the like dissolved in water solution or water can be used as an oxidizing agent for nitrogen monoxide without feeding gaseous chlorine dioxide or ozone into the oxidation column. The oxidation column used in the present process includes a packed column, a spray column, a plate column or the like. The oxidation column used in the present invention preferably includes a Moredana plate column having a free space ratio of 0.25 – 0.60. The Moredana plate column has the following advantages, and in a case where it is used in the oxidation of nitrogen monoxide a high rate of oxidation is obtained. That is the pressure drop through the plate is low, the gas-liquid contacting effect on the plate is high, and the gas flow rate of gas can be treated in a relatively small apparatus. The amount of chlorine dioxide or ozone to be added in the oxidation step of the present invention is controlled to meet the stoichiometric relationship to nitrogen monoxide shown in the equation (1), (2) or (3) in accordance with the content of nitrogen monoxide in the gas to be treated.

In the present denitration process, the oxidized gas is fed to an absorption column where the gas is generally brought into contact with 1 – 25% by weight of an aqueous sodium chlorite solution having a pH of not less than 5 during six or more seconds of gas-liquid contacting time, and thereby nitrogen dioxide contained in the gas to be fed into the absorption column is removed from the gas by the chemical reaction shown in the equation (4). The absorption column employed in the present invention includes a spray scrubber, a packed column, a plate column and the like. However a Moredana plate column having a free-space ratio of 0.25 – 0.60 is preferably employed as the absorption column in the present invention because the pressure drop through the plate is low and because the overall mass-transfer coefficient of the column is high.

Further in case a little amount of chlorine, chlorine dioxide or ozone is contained in the denitrated off-gas, it can be removed from the off-gas by scrubbing with, for example, an aqueous alkali solution at the top of or at the outlet of the absorption column.

This invention is illustrated by, but by no means limited to the following examples.

EXAMPLE 1

Gas containing 200 ppm of nitrogen monoxide (NO) at a temperature of approximately 60°C was continuously passed, together with 100 ppm of chlorine dioxide ($ClO_2$) gas, through a Moredana plate column comprising two perforated plates having a hole diameter of 8 mm and a free-space ratio of 0.31, where it was brought into countercurrent contact with 2% by weight of sodium chlorite ($NaClO_2$) in a water solution under conditions of, superficial gas velocity in the column of 3 m/sec and a liquid-gas ratio (L/G) in the column of 3.

The nitrogen monoxide (NO) content and the nitrogen dioxide ($NO_2$) content in gas at the outlet of the column were 0 and 110 ppm, respectively.

Effluent gas from the Moredana plate column was then continuously passed at a superficial gas velocity of 0.1 m/sec through an absorption column comprising a packed column having a fixed bed of 2 m and provided with Tellerette packing, where it was brought in countercurrent contact with 2% by weight of an aqueous sodium chlorite ($NaClO_2$) solution under a liquid-gas ratio (L/G) of 10. The nitrogen oxides content in off-gas from the absorption column was 15 ppm.

As a comparative example, a gas absorption test from gas containing 200 ppm of nitrogen monoxide was repeated in the same manner as mentioned above except that chlorine dioxide ($ClO_2$) gas was not added. Nitrogen monoxide and nitrogen dioxide contents in effluent gas from the first column were 96 and 59 ppm, respectively, and nitrogen monoxide and nitrogen dioxide contents in off-gas from the second column were 60 and 43 ppm, respectively.

EXAMPLE 2

Gas containing 150 ppm of nitrogen monoxide (NO) at a temperature of approximately 60°C was continuously passed, together with 75 ppm of chlorine dioxide ($ClO_2$) gas, through a Moredana plate column comprising two perforated plates having a hole diameter of 8 mm and a free-space ratio of 0.31, where it was brought in countercurrent contact with general water or industrial water under the conditions of superficial gas velocity in the column of 3 m/sec and liquid-gas ratio (L/G) in the column of 3. Nitrogen monoxide and nitrogen dioxide contents in effluent-gas from the column were 1 and 81 ppm, respectively.

Then, effluent gas from the Moredana plate column was continuously passed, at a superficial gas velocity of 0.1 m/sec, through an absorption column comprising a packed column having a height of fixed bed of 2 m and provided with Tellerette packing, where it was treated with 2% by weight of an aqueous sodium chlorite ($NaClO_2$) solution. The $NaClO_2$ solution fell downwardly in a countercurrent flow relationship to the upflowing gas in the column under liquid-gas flow ratio (L/G) of 10. Nitrogen monoxide and nitrogen dioxide contents in off-gas from the absorption column were 0 and 10 ppm, respectively.

As a comparative example, a gas absorption test from gas containing 150 ppm of nitrogen monoxide was repeated in the same manner as mentioned above except that 2% by weight aqueous sodium hydroxide (NaOH) solution was used, instead of an aqueous sodium chlorite $NaClO_2$) solution, as the liquid absorbent in the absorption column. Nitrogen monoxide and nitrogen dioxide contents in off-gas from the absorption column were 0 and 45 ppm, respectively.

EXAMPLE 3

Waste gas containing 180 ppm of nitrogen monoxide (NO) and 40 ppm of nitrogen dioxide ($NO_2$) at a temperature of approximately 40°C was continuously fed to an absorption column comprising a Moredana plate column having eight perforated plates with a free-space ratio of 0.32 after 90 ppm of chlorine dioxide $ClO_2$) was added into the waste gas at the feeding duct of the waste gas into the absorption column. The flow of the waste gas in the feeding duct was turbulent, and nitrogen monoxide and nitrogen dioxide contents at the gas inlet of the absorption column were 10 and 120 ppm, respectively. In the absorption column, 3% by weight of an aqueous sodium chlorite ($NaClO_2$) solution fell downwardly in a countercurrent flow relationship to the upflowing gas under the condition of superficial gas velocity in the column of 3 m/sec and a liquid-gas flow ratio (L/G) of 3.

Nitrogen monoxide and nitrogen dioxide contents in the off-gas from the absorption column were 10 and 10 ppm, respectively.

EXAMPLE 4

Gas containing 260 ppm of nitrogen monoxide (NO) at a temperature of approximately 60°C was continuously passed, together with 260 ppm of ozone ($O_3$) gas, through a Moredana plate column comprising two perforated plates having a hole diameter of 8 mm and a free-space ratio of 0.32, where it was brought into countercurrent contact with 5% by weight of sodium chlorite ($NaClO_2$) in a water solution under conditions of, superficial gas velocity in the column of 3 m/sec and a liquid-gas ratio (L/G) in the column of 4.

The nitrogen monoxide (NO) content and the nitrogen dioxide ($NO_2$) content in gas at the outlet of the column were 0 and 240 ppm, respectively.

Effluent gas from the Moredana plate column was then continuously passed at a superficial gas velocity of 0.5 m/sec through an absorption column comprising a packed column having a fixed bed of 2 m and provided with Tellerette packing, where it was brought in countercurrent contact with 3% by weight of an aqueous sodium chlorite ($NaClO_2$) solution under a liquid-gas ratio (L/G) of 5. The nitrogen oxides content in off-gas from the absorption column was 18 ppm.

EXAMPLE 5

Waste gas containing 280 ppm of nitrogen monoxide (NO) and 100 ppm of nitrogen dioxide ($NO_2$) at a temperature of approximately 40°C was continuously fed to an absorption column comprising a Moredana plate column having eight perforated plates with a free-space ratio of 0.32 after 280 ppm of ozone ($O_3$) was added into the waste gas at the feeding duct of the waste gas into the absorption column. The flow of the waste gas in the feeding duct was turbulent, and nitrogen monoxide and nitrogen dioxide contents at the gas inlet of the absorption column were 0 and 364 ppm, respectively. In the absorption column, 3% by weight of an aqueous sodium chlorite ($NaClO_2$) solution fell downwardly in a countercurrent flow relationship to the upflowing gas under the condition of superficial gas velocity in the column of 2 m/sec and a liquid-gas flow ratio (L/G) of 5.

Nitrogen monoxide and nitrogen dioxide contents in the off-gas from the absorption column were 0 and 25 ppm, respectively.

What is claimed is:

1. A process for removing nitrogen oxides from waste gas containing nitrogen oxides comprising the steps of adding chlorine dioxide to the waste gas whereby nitrogen monoxide contained in the waste gas is converted to $NO_2$ and then removing the resultant $NO_2$ by contacting the waste gas with an aqueous sodium chlorite solution in an absorption column.

2. The process as claimed in claim 1, wherein said chlorine dioxide is added to the waste gas at the feeding pipe or duct of said waste gas into the absorption column.

3. The process as claimed in claim 1, wherein said chlorine dioxide is added to the waste gas in an oxidation column wherein a gaseous mixture of the chlorine dioxide and the waste gas is in contact with water or an aqueous sodium chlorite solution, and then the gaseous mixture is brought into contact with the aqueous sodium chlorite solution in the absorption column.

4. The process as claimed in claim 1, wherein a mole ratio of the chlorine dioxide to nitrogen monoxide is substantially 0.5.

5. The process as claimed in claim 1, wherein a concentration of the aqueous sodium chlorite solution is between 1 and 25% by weight.

6. A process for removing nitrogen oxides from waste gas containing nitrogen oxides comprising the steps of adding ozone in an amount of a mol ratio of ozone to nitrogen monoxide in the range from about 0.5 to about 1.0 to the waste gas whereby nitrogen monoxide contained in the waste gas is converted to $NO_2$ and then removing the resultant $NO_2$ by contacting the waste gas with an aqueous sodium chlorite solution in an absorption column.

7. The process as claimed in claim 6 wherein said ozone is added to the waste gas at the feeding pipe or duct of said waste gas into the absorption column.

8. the process as claimed in claim 6, wherein said ozone is added to the waste gas in an oxidation column, wherein a gaseous mixture of the ozone and the waste gas is in contact with water or an aqueous sodium chlorite solution, and then the gaseous mixture is brought into contact with the aqueous sodium chlorite solution in the absorption column.

9. The process as claimed in claim 6, wherein a concentration of the aqueous sodium chlorite solution is between 1 and 25% by weight.

* * * * *